(12) United States Patent
Aota et al.

(10) Patent No.: US 7,580,599 B2
(45) Date of Patent: Aug. 25, 2009

(54) OPTICAL SWITCH AND MEMS PACKAGE

(75) Inventors: Hirofumi Aota, Kawasaki (JP); Kohei Shibata, Kawasaki (JP); Tamotsu Akashi, Kawasaki (JP); Tsuyoshi Yamamoto, Kawasaki (JP); Naoki Hashimoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 12/153,820

(22) Filed: May 23, 2008

(65) Prior Publication Data

US 2008/0317405 A1 Dec. 25, 2008

(30) Foreign Application Priority Data

Jun. 22, 2007 (JP) .............................. 2007-165528

(51) Int. Cl.
*G02B 6/34* (2006.01)
*G02B 6/35* (2006.01)

(52) U.S. Cl. .......................................... 385/18; 385/37

(58) Field of Classification Search ........................ None
See application file for complete search history.

(56) References Cited

U.S. PATENT DOCUMENTS 6,046,839 A 4/2000 Ito et al.
6,295,154 B1* 9/2001 Laor et al. ................... 359/223
6,588,948 B2* 7/2003 Tatoh et al. .................. 385/93

FOREIGN PATENT DOCUMENTS

| JP | 57083080 A | * | 5/1982 |
| JP | 8-148594 | | 6/1996 |
| JP | 11-271698 | | 10/1999 |
| JP | 2005-136119 | | 5/2005 |

OTHER PUBLICATIONS

Kenichi Sato et al., "Cutting-edge Technologies on Photonic Backbone Networks", Institute of Electronics, Information and Communication Engineers Journal, Feb. 2002, vol. 85 No. 2, pp. 94-103.

* cited by examiner

*Primary Examiner*—Omar Rojas
(74) *Attorney, Agent, or Firm*—Fujitsu Patent Center

(57) ABSTRACT

An optical switch switches ports through which a beam is input and output and includes an optical system through which the beam passes; a movable reflector that is enclosed in a casing and reflects, at a variable angle, the beam that has passed through the optical system; and a transmissive window that is disposed in the casing at a position through which the beam passes, is made of a uniaxial crystal, and obtains a phase difference with respect to the beam passing therethrough having a wavelength $\lambda$. The phase difference is $\lambda/4$ times a positive odd integer and results from a setting of an orientation of a crystal axis and a thickness of the transmissive window.

9 Claims, 13 Drawing Sheets

OPTICAL SWITCH AND MEMS PACKAGE

CROSS-REFERENCE TO RELATED APPLICATIONS

This application is based upon and claims the benefit of priority from the prior Japanese Patent Application No. 2007-165528, filed on Jun. 22, 2007, the entire contents of which are incorporated herein by reference.

BACKGROUND OF THE INVENTION

1. Field of the Invention

The present invention relates to an optical switch and a micro-electro-mechanical system (MEMS) package that switch routes of beams in optical communication.

2. Description of the Related Art

Nowadays, to handle the explosion of Internet traffic, networks are rapidly being changed to optical networks based on wavelength division multiplexing (WDM) communication. Although the WDM communication at present mostly takes a form of a point-to-point network, such communication is expected to be advanced to a ring network or a mesh network in the near future.

Moreover, it is expected that add/drop of any given wavelength, optical cross connect (OXC) without conversion to electrical signals, and the like will be enabled at each node forming the network, and that dynamic path setting/releasing based on wavelength information will be performed.

In this way, photonic network technology that makes the most of optical technology is being developed (refer to, for example, "Institute of Electronics, Information and Communication Engineers Journal", Feb. 1, 2002, February 2002 issue, pp. 94-103). A wavelength selective switch related to the present invention is an optical switch that is arranged in a node of a ring network or a mesh network, and has a function of selecting an output port to which a signal is to be sent depending on a wavelength thereof.

FIG. 14 is a plan view of a conventional wavelength selective switch. As shown in FIG. 14, a conventional wavelength selective switch 140 includes a port group 141, a collimating lens group 142, a dispersing element 143, a converging lens 144, a λ/4 plate 145, and a MEMS package 146.

A WDM beam having plural wavelengths input through the port group 141 is collimated by the collimating lens 142 to be transmitted to the dispersing element 143. Generally, a diffraction grating or the like is used as the dispersing element 143. The diffraction grating is an optical device that is formed with a glass substrate on which a number of parallel grooves are arranged at uniform intervals. The plural wavelength components of the WDM beam are input into the diffraction grating at a specific angle and the diffraction grating outputs the wavelength components at different output angles, according to wavelength, utilizing the diffraction phenomenon of light.

The dispersing element 143 disperses the WDM beam into components according to wavelength. The dispersed components are transmitted to the converging lens 144. Respective beams of the components that have passed through the converging lens 144 are transmitted to the MEMS package 146 via the λ/4 plate 145. The MEMS package 146 includes plural MEMS mirrors 147 arranged in an array. The MEMS mirrors 147 are movable reflectors that independently reflect the beams respectively converged by the converging lens 144.

The beams reflected by the MEMS package 146 pass through the λ/4 plate 145, the converging lens 144, the dispersing element 143, and the collimating lens group 142 again, and then are output from the port group 141. Hereinafter, the spectral direction, with respect to the beams dispersed by the dispersing element 143 according to wavelength, is referred to as a wavelength distribution direction. Furthermore, a direction of a beam that is collimated by the collimating lens group 142 and transmitted to the dispersing element 143 is referred to as an optical axis direction.

FIG. 15 is a front view of the conventional wavelength selective switch. As shown in FIG. 15, the port group 141 includes ports 0 to 4 that are arranged in a direction different from the wavelength distribution direction. The MEMS mirror 147 in the MEMS package 146 is freely rotatable about an axis oriented in the wavelength distribution direction, and reflects beams emitted from the converging lens 144 through the λ/4 plate 145 at a variable tilt angle. The wavelength selective switch 140 switches ports through which a beam is input and output by changing the tilt angle of the MEMS mirror 147.

Hereinafter, the direction in which the ports 0 to 4 are arranged is referred to as a port arranging direction. In the MEMS package 146, the MEMS mirror 147 is airtightly sealed in a casing to avoid the effects of humidity or a foreign substance. With consideration of mechanical strength and light transmission, generally, sapphire glass is used for a transmissive window 148 provided in the casing of the MEMS package 146 (for example, Japanese Patent No. 3777045).

Sapphire glass is a uniaxial crystal, and is birefringent in some crystal axial directions. To eliminate the effect of birefringence of sapphire glass, a structure in which the direction of C-axis of sapphire glass forming the transmissive window 148 and the direction of beams that pass through the transmissive window 148 are identical has been disclosed in, for example, Japanese Patent Laid-Open Publication Nos. H8-148594 and 2005-136119.

The wavelength selective switch 140 includes more than one element that causes polarization dependent loss (PDL) as typified by a dispersing element such as a diffraction grating. Therefore, it is difficult to keep PDL in the entire wavelength selective switch 140 lower than a specified value for the system, just by suppressing PDL in each individual element. For this reason, the λ/4 plate 145 is arranged between the MEMS package 146 and the converging lens 144 to cancel PDL.

The λ/4 plate 145 obtains a λ/4 phase difference between ordinary and extraordinary light of a beam that passes through the λ/4 plate 145. Therefore, the polarization of a beam from the port group 141 to the MEMS package 146 and that of a beam reflected from the MEMS package 146 toward the port group 141 become orthogonal with respect to each other. As a result, PDL is canceled. Thus, PDL of beams that are output from the wavelength selective switch 140 is reduced.

In the above conventional technique, the λ/4 plate 145 is provided in the wavelength selective switch 140. Therefore, the number of optical elements constituting the wavelength selective switch 140 increases, and a holding mechanism to adjust and fix the λ/4 plate 145 on an optical path is required, thereby increasing the size of the wavelength selective switch 140 and complicating manufacturing of the wavelength selective switch 140.

In addition, since the λ/4 plate 145 is expensive, the cost of the wavelength selective switch 140 becomes high. Moreover, as the λ/4 plate 145 is fragile, if the λ/4 plate 145 is provided in the wavelength selective switch 140, handling of the wavelength selective switch 140 becomes difficult. For example, in the case of the λ/4 plate 145 made of quartz, when the wavelength to be used is 1550 millimeters (mm), thickness of the λ/4 plate 145 at zero-order is to be 50 micrometers (μm), making the λ/4 plate 145 fragile.

SUMMARY OF THE INVENTION

It is an object of the present invention to at least solve the above problems in the conventional technologies.

An optical switch according to one aspect of the present invention includes a plurality of ports through which a beam is input and output; an optical system through which the beam passes; a movable reflector that is enclosed in a casing and reflects, at a variable angle, the beam that has passed through the optical system; and a transmissive window that is disposed in the casing at a position through which the beam passes, is made of a uniaxial crystal, and obtains a phase difference with respect to the beam passing therethrough having a wavelength λ. The phase difference is λ/4 times a positive odd integer and results from a setting of an orientation of a crystal axis and a thickness of the transmissive window.

A MEMS package according to another aspect of the present invention includes a movable reflector that reflects a beam at a variable angle; a casing that encloses the movable reflector; and a transmissive window that is disposed in the casing at a position through which the beam passes, is made of a uniaxial crystal, and obtains a phase difference with respect to the beam passing therethrough having a wavelength λ. The phase difference is λ/4 times a positive odd integer and results from a setting of an orientation of a crystal axis and a thickness of the transmissive window.

The other objects, features, and advantages of the present invention are specifically set forth in or will become apparent from the following detailed description of the invention when read in conjunction with the accompanying drawings.

DETAILED DESCRIPTION OF THE PREFERRED EMBODIMENTS

Exemplary embodiments according to the present invention are explained in detail below with reference to the accompanying drawings.

Figure 1:
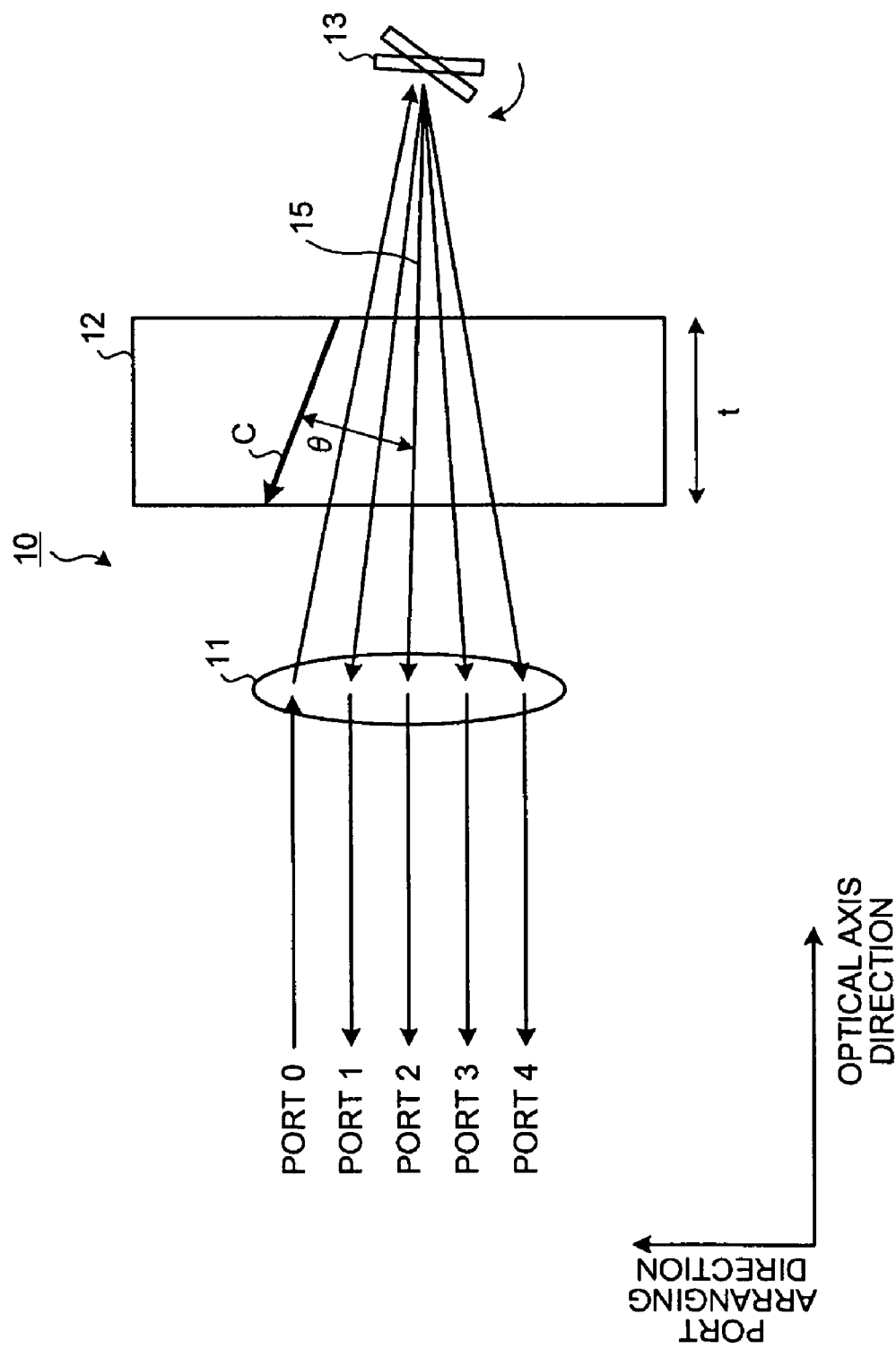
FIG. 1 is a front view of an optical switch according to a first embodiment of the present invention.

FIG. 1 is a front view of an optical switch according to a first embodiment of the present invention. An optical switch 10 according to the first embodiment is a wavelength selective switch that switches paths depending on a wavelength of a beam. As shown in FIG. 1, the optical switch 10 includes a plurality of input/output ports (port 0 to port 4), a converging lens 11, a transmissive window 12, and a MEMS mirror 13.

The respective input/output ports (port 0 to port 4) are formed with an optical fiber or the like. Light from an external source is input to the input/output ports and is output from the input/output ports to an external device. In this example, port 0 is an input port, and port 1 to port 4 are output ports. Through port 0, light input from an external source is transmitted to the converging lens 11. Through ports 1 to port 4, light transmitted from the converging lens 11 is output to an external device.

The converging lens 11 converges light input through port 0 onto the MEMS mirror 13 through the transmissive window 12. Light reflected from the MEMS mirror 13 is transmitted through the transmissive window 12 to the converging lens 11, and is transmitted to port 1, port 2, port 3, or port 4 depending on the reflection angle.

The MEMS mirror 13 (movable reflector) reflects light transmitted from the converging lens 11 through the transmissive window 12 at a variable tilt angle to transmit light back to the converging lens 11 through the transmissive window 12. The MEMS mirror 13 is airtightly packaged in a casing (not shown) that includes the transmissive window 12. The transmissive window 12 is provided in the casing, which airtightly encloses the MEMS mirror 13, at a position through which beams that are transmitted between the converging lens 11 and the MEMS mirror 13 pass.

The transmissive window 12 is a uniaxial crystal such as a sapphire crystal. Contrary to the point of view taken regarding the conventional technique disclosed in Japanese Patent Laid-Open Publication Nos. H8-148594 and 2005-136119, in the optical switch and the MEMS package according to the present invention, a function of a λ/4 plate is given to the transmissive window 12 to utilize the birefringence of the uniaxial crystal forming the transmissive window 12. Therefore, the transmissive window 12 is arranged such that a direction of the C-axis of the transmissive window 12 differs from a direction of beams that pass through the transmissive window 12. For example, the transmissive window 12 is formed by cutting each side of sapphire crystal at a certain angle with respect to the C-axis.

In this example, the transmissive window 12 is a parallel plate made of sapphire crystal. When a thickness of the transmissive window 12 is t, the angular difference between a crystal axis (C-axis of sapphire crystal) of the transmissive window 12 and a beam passing through the transmissive window 12 is θ, birefringence of the transmissive window 12 dependent on the angular difference θ is $\Delta n(\theta)$, the refractive index of an extraordinary beam component at the transmissive window 12 is ne, and the refractive index of an ordinary beam component at the transmissive window 12 is no, a condition for the transmissive window 12 to have the function of a λ/4 plate can be expressed by Equation 1 below.

$$t = \frac{(2m+1) \cdot \lambda/4}{\Delta n(\theta)} (m = 0,1,2, \ldots) \quad (1)$$

The birefringence $\Delta n(\theta)$ in Equation 1 above can be expressed by Equation 2 below.

$$\Delta n(\theta) = no - \frac{ne \cdot no}{\sqrt{(ne \cdot \cos(\theta))^2 + (no \cdot \sin(\theta))^2}} \quad (2)$$

When a wavelength of light passing through the transmissive window 12 is λ, it is possible to impart the function of a λ/4 plate to the transmissive window 12 by setting the birefringence $\Delta n(\theta)$ and the thickness t such that the phase difference obtained between ordinary light and extraordinary light of a beam in the transmissive window 12 is 2m+1 times λ/4 (where m is 0,1,2 . . . ), i.e., a positive odd integer times λ/4, as shown in Equation 1 above. Since the birefringence $\Delta n(\theta)$ is dependent on the angular difference θ, the birefringence $\Delta n(\theta)$ can be adjusted by adjusting a direction of the crystal axis of the transmissive window 12.

For example, for a beam 15 that is transmitted from the MEMS mirror 13 through the transmissive window 12 to port 2, the crystal axis (C-axis) and the thickness t of the transmissive window 12 are set so as to satisfy Equation 1 above. Thus, the function of a λ/4 plate that obtains a phase difference of a positive odd integer times λ/4 for the beam 15 is implemented by the transmissive window 12.

Figure 15:
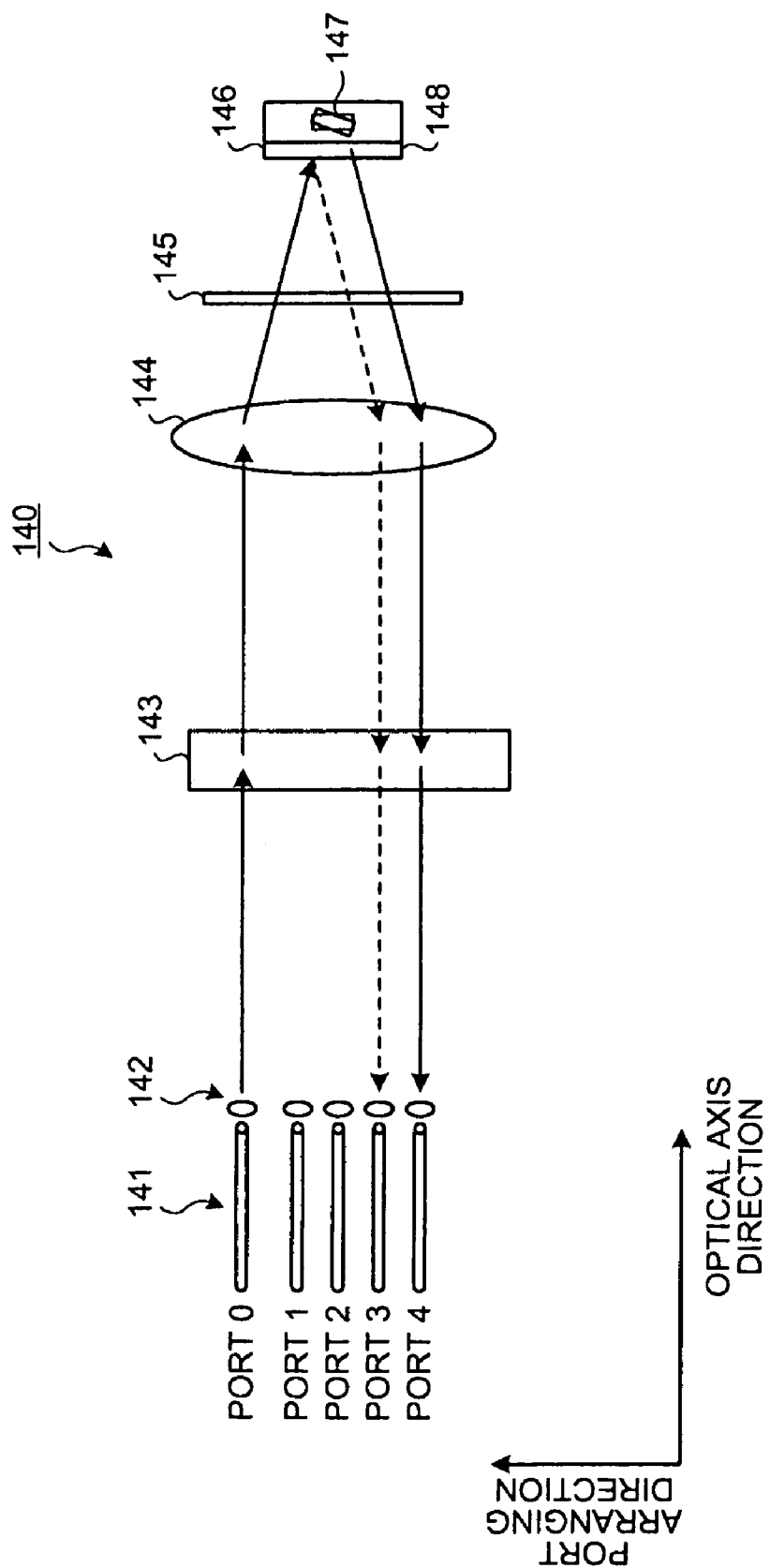
FIG. 15 is a front view of the conventional wavelength selective switch.

Although it is not illustrated, the optical switch 10 can include a collimating lens (refer to 142 shown in FIG. 15) that collimates beams transmitted from port 1, port 2, port 3, and port 4 to transmit to the converging lens 11, and that concentrates respective light transmitted from the converging lens 11 toward port 1, port 2, port 3, and port 4 at respective ports. Moreover, the optical switch 10 can include a dispersing element (refer to 143 shown in FIG. 15) such as a diffraction grating between port 1 to port 4 and the converging lens 11.

When the optical switch 10 includes a dispersing element, the MEMS mirror 13 is disposed corresponding to each separated beam obtained by the effect of the dispersing element. The MEMS mirrors 13 (refer to 147 shown in FIG. 15) are arrayed along the wavelength distribution direction, and reflect separately, according to wavelength, respective beams (for example, CH1 to CH40) that are separated by the dispersing element and are converged by the converging lens 11. Thus, the optical switch 10 is enabled to perform path switching according to a wavelength of an input beam.

An example in which port 0 is used as an input port and port 1 to port 4 are used as output ports has been explained; however, the optical switch 10 can be used using port 0 as an output port and port 1 to port 4 as input ports. In this case, the path switching is performed by selecting a beam to be output through port 0 from among beams that are input through port 1 to port 4.

Figure 2:
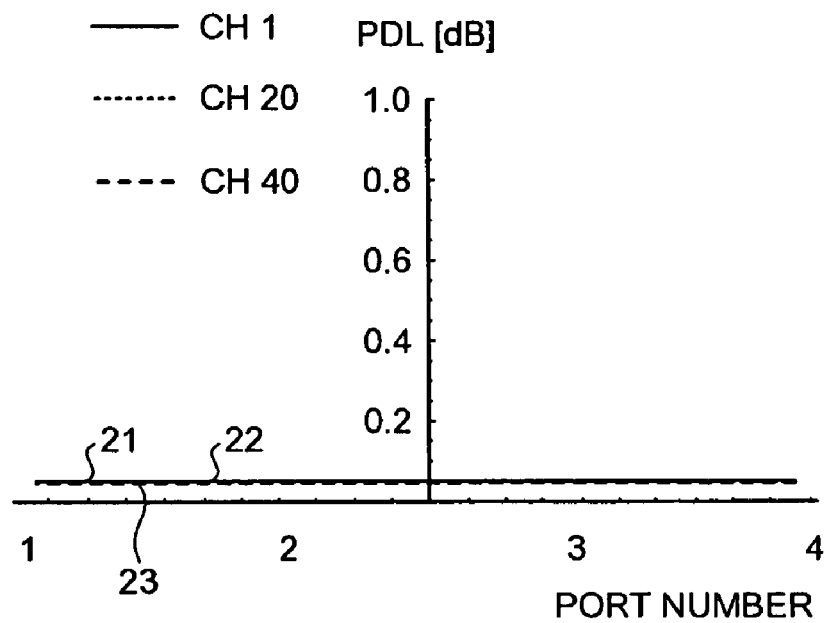
FIG. 2 is a graph showing PDL characteristics (t=50 μm) of the optical switch.

FIG. 2 is a graph showing PDL characteristics (t=50 μm) of the optical switch. FIG. 2 shows a calculation example of PDL using Jones vector when the initial PDL in an optical system, such as a diffraction grating, included in the optical switch 10 is 1.6 dB, the angular difference between the beam transmitted from port 0 and the beam transmitted from port 4 in the transmissive window 12 is 10°, and the transmissive window 12 is sapphire crystal having a thickness of 50 μm.

In the graph shown in FIG. 2, the horizontal axis indicates port numbers (1 to 4) of port 1 to port 4. The vertical axis indicates PDL (dB) of a beam that is input through port 0 and output through port 1, port 2, port 3, or port 4. A solid line 21 indicates PDL characteristics of CH1. A dotted line 22 indicates PDL characteristics of CH20. A broken line 23 indicates PDL characteristics of CH40. In this example, the solid line 21, the dotted line 22, and the broken line 23 substantially overlap each other.

Since the transmissive window 12 has the function of the λ/4 plate, polarization of a beam toward the MEMS mirror 13 from port 0 to port 4 and a beam toward port 0 to port 4 from the MEMS mirror 13 becomes orthogonal to each other, thereby cancelling PDL. Therefore, when the thickness t of the transmissive window 12 is 50 μm, the PDL characteristics have almost no port dependency nor CH (wavelength) dependency as shown in FIG. 2. Thus, the initial PDL can be substantially completely cancelled.

As described, according to the optical switch 10 of the first embodiment, by setting the orientation of the crystal axis and the thickness t of the transmissive window 12, the function of the λ/4 plate can be imparted to the transmissive window 12 in the casing of the MEMS mirror 13. Therefore, it is possible to reduce PDL without employing the λ/4 plate.

Furthermore, according to the optical switch 10 of the first embodiment, the size of the optical switch 10 can be reduced since PDL can be reduced by a simple configuration without the λ/4 plate and, a holding mechanism to adjust the position of the λ/4 plate and to fix the λ/4 plate is not required. As a result, the manufacturing process of the optical switch 10 is simplified, and the cost thereof is lowered.

Moreover, the utilization of a material of high strength such as sapphire crystal for the transmissive window 12 that has the function of the λ/4 plate provides the optical switch 10 with greater durability as compared with an optical switch that employs the λ/4 plate, which is fragile. Therefore, handling of the optical switch 10 becomes easy as compared with the optical switch employing the λ/4 plate.

Figure 3:
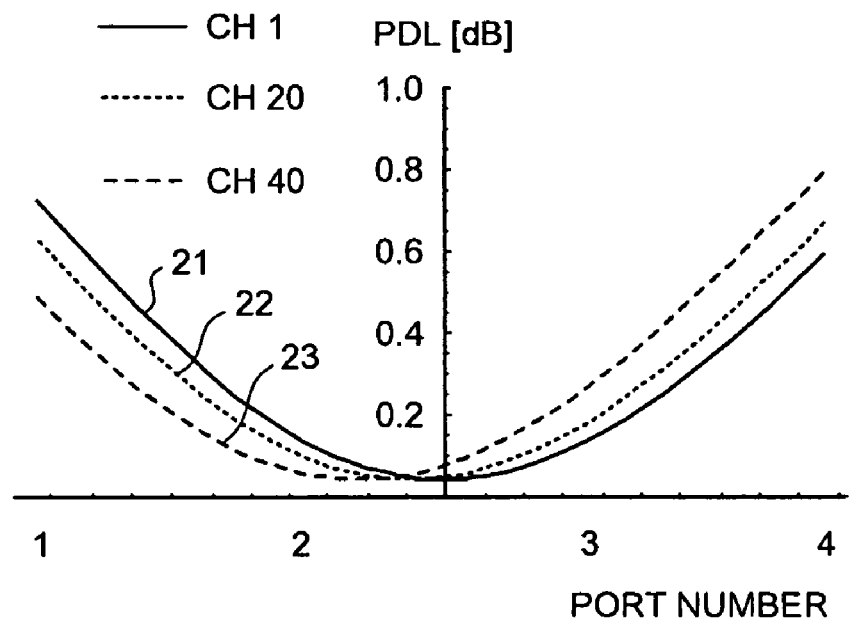
FIG. 3 is a graph showing PDL characteristics (t=1 mm) of the optical switch.

FIG. 3 is a graph showing PDL characteristics (t=1 mm) of the optical switch. The transmissive window 12 of the casing that airtightly seals the MEMS mirror 13 must have a thickness of, for example, 1 millimeter (mm) or more to be of a sufficient strength. FIG. 3 shows a calculation example of PDL using Jones vector when the thickness of the transmissive window 12 is 1 mm while other conditions are the same as those in the example shown in FIG. 2.

As shown in FIG. 3, in the optical switch 10 according to the first embodiment, when the thickness t of the transmissive window 12 is 1 mm, PDL is sufficiently reduced at port 2 and port 3; however, PDL is not sufficiently reduced at port 1 and port 4. To tackle this problem, a configuration in which PDL is sufficiently reduced in all ports while maintaining the thickness t of the transmissive window 12 by distributing the thickness t is explained as a second embodiment of the present invention.

Figure 4:
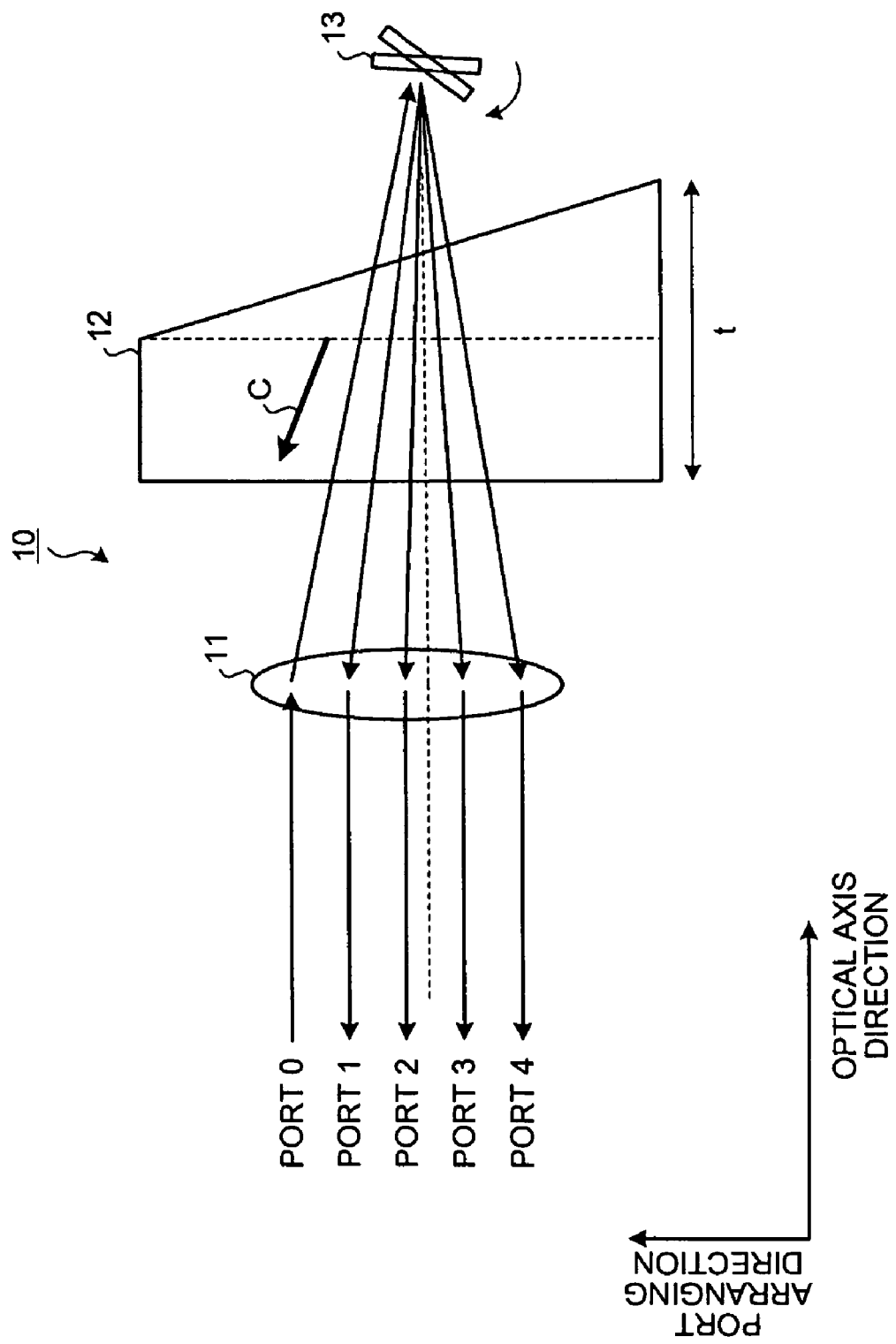
FIG. 4 is a front view of an optical switch according to a second embodiment.

FIG. 4 is a front view of an optical switch according to the second embodiment. As shown in FIG. 4, the thickness t of the transmissive window 12 of the optical switch 10 according to the second embodiment is distributed (varied) in the port arranging direction. By thus setting the thickness t, all phase differences obtained with respect to a beam that is transmitted through port 0 and then passes through the transmissive window 12 and a beam that passes through the transmissive window 12 and then is transmitted to port 1, port 2, port 3, or port 4 become positive odd integer times λ/4.

Figure 5:
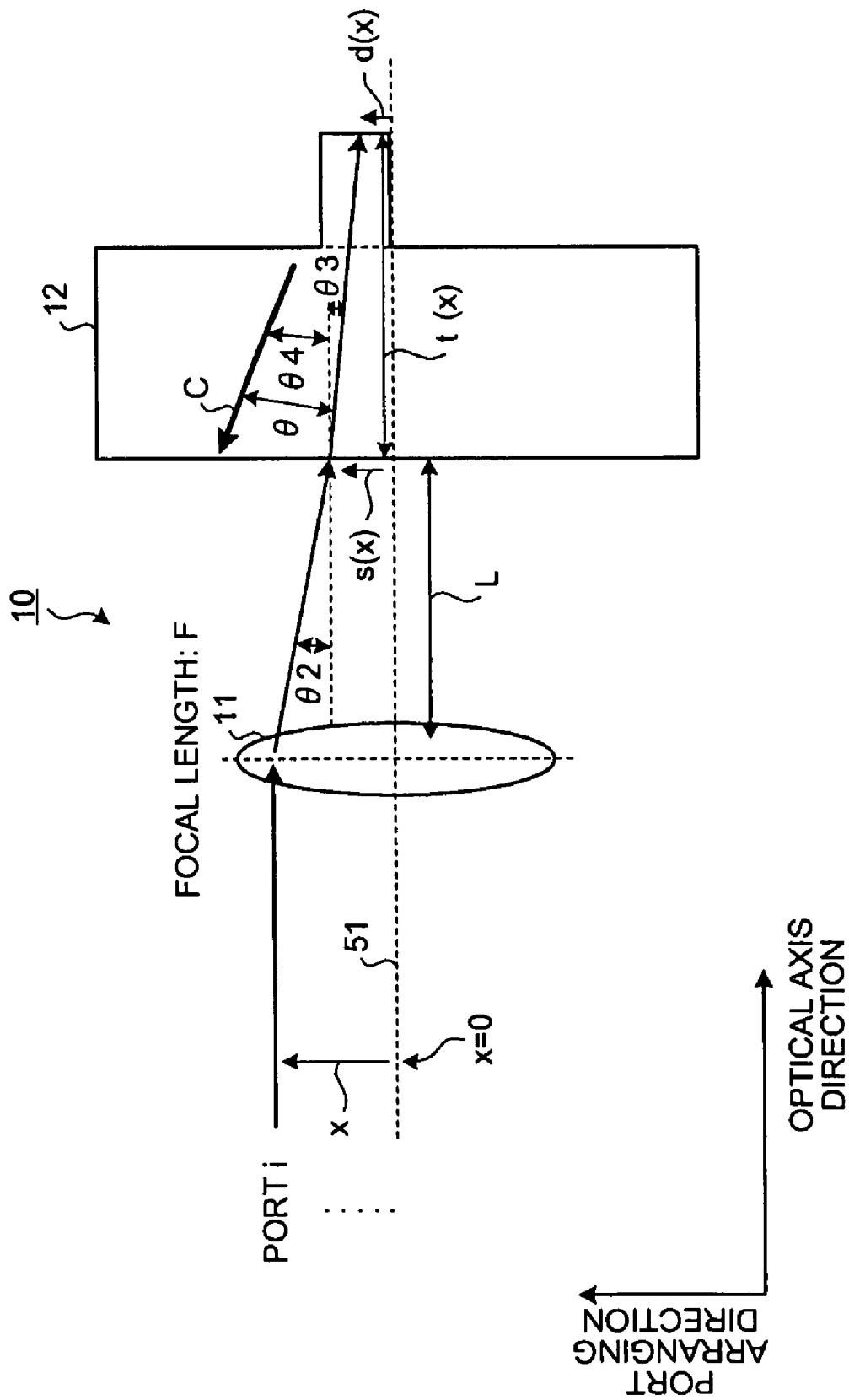
FIG. 5 is a schematic showing a design example of a thickness t of a transmissive window.

FIG. 5 is a schematic showing a design example of the thickness t of the transmissive window. FIG. 5 shows a design example of the thickness t of the transmissive window 12 when a surface of the transmissive window 12 (a surface opposing the converging lens 11) is a plane parallel to the port arranging direction. In the example shown in FIG. 5, an axis 51 that passes through the center of curvature of the converging lens 11 is the reference axis. A position of each port (port i herein) in the port arranging direction is x.

A beam that is transmitted from a position of x=0 passes through the center of curvature of the converging lens 11, and then enters the transmissive window 12 at an incident angle of 0°. A focal length of the converging lens 11 is F, a distance from a main surface of the converging lens 11 to the surface of the transmissive window 12 opposing the converging lens 11 is L, and an incident angle of a beam to the transmissive window 12 is θ2. In the port arranging direction, an incident position s(x) of a beam with respect to the surface of the transmissive window 12 opposing the converging lens 11 can be expressed as in Equation 3 below.

$$s(x)=x-L \cdot \text{Tan}(\theta 2) \quad (3)$$

The incident angle θ2 in Equation 3 above can be expressed as in Equation 4 below.

$$\theta 2 = \text{Arc Tan}(x/F) \quad (4)$$

Furthermore, when an angular difference between a beam inside the transmissive window 12 and the axis 51 is θ3, an angular difference between the crystal axis (C-axis) of the transmissive window 12 and the axis 51 is θ4, and an angular difference between a beam inside the transmissive window 12 and the crystal axis (C-axis) of the transmissive window 12 is θ, θ3 can be expressed as in Equation 5 below.

$$\theta 3 = \text{Arc Sin}(\text{Sin}(\theta 2)/no) \quad (5)$$

The angular difference θ can be expressed as in Equation 6 below.

$$\theta = \theta 3 + \theta 4 \quad (6)$$

A thickness t(x) of the transmissive window 12 by which all phase differences that are obtained with respect to beams from port i corresponding to the position x of port i become positive odd integer times λ/4 can be expressed as in Equation 7 below.

$$t(x) = (2m+1)\frac{\lambda/4}{F(x)} (m=0,1,2,\ldots) \quad (7)$$

F(x) in Equation 7 above is determined from the birefringence Δn(θ) and the direction of the crystal axis (C-axis) of the transmissive window 12 and the angle (θ3) of a beam passing through the transmissive window 12, and can be expressed as in Equation 8 below.

$$F(x) = \frac{1}{\text{Cos}(\theta 3)}\left(no - \frac{ne \cdot no}{\sqrt{(ne \cdot \text{Cos}(\theta))^2 + (no \cdot \text{Sin}(\theta))^2}}\right) \quad (8)$$

In the port arranging direction, a position d(x) through which a beam passes a surface of the transmissive window 12 (a surface opposing the MEMS mirror 13) can be expressed as in Equation 9 below using t(x) and s(x).

$$d(x)=s(x)-t(x) \cdot \text{Tan}(\theta 3) \quad (9)$$

By setting t(x), which is correlated with the position d(x), so as to satisfy Equation 7 above, all phase differences that are obtained with respect to beams from all ports become positive odd integer times λ/4. Thus, the transmissive window 12 implements the function of the λ/4 plate with respect to a beam that is input and output through any of the ports (port 1 to port 4).

Figure 6:
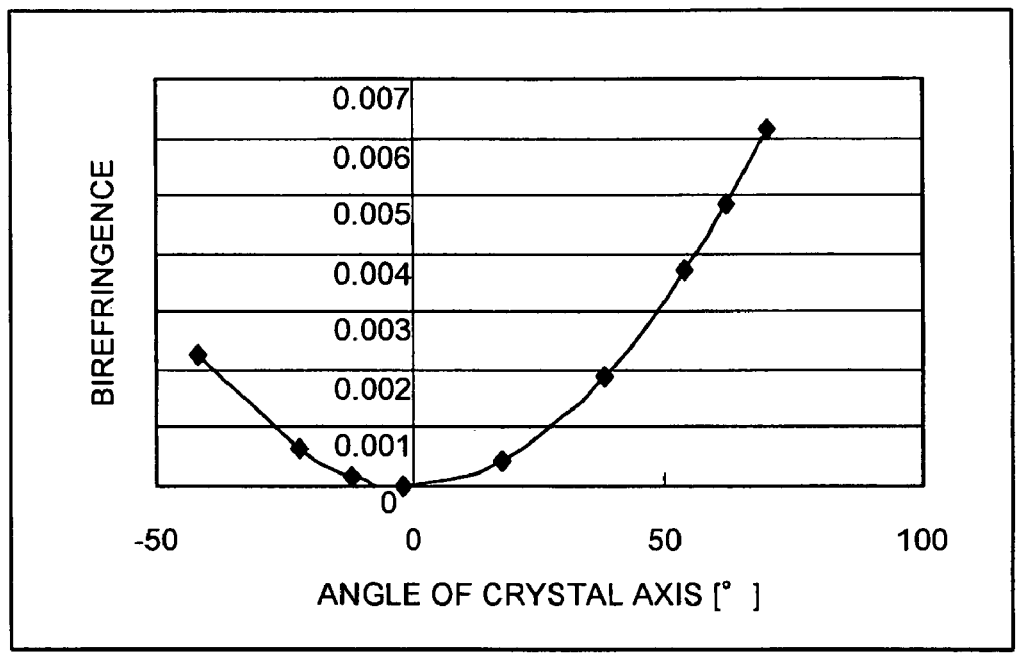
FIG. 6 is a graph showing a relationship between an angle of a crystal axis and birefringence.

FIG. 6 is a graph showing a relationship between an angle of the crystal axis of the transmissive window and birefringence. In FIG. 6, the horizontal axis indicates an angle of the crystal axis (C-axis) of a sapphire crystal that constitutes the transmissive window 12. The vertical axis indicates birefringence of the transmissive window 12. As shown in FIG. 6, the birefringence of the transmissive window 12 has characteristics close to a quadratic function with respect to the angle of the crystal axis of the transmissive window 12. Therefore, depending on the angle of the crystal axis of the transmissive window 12, the thickness t(x) of the transmissive window 12 that satisfies Equation 7 above also has characteristics close to a quadratic function.

Figure 7:
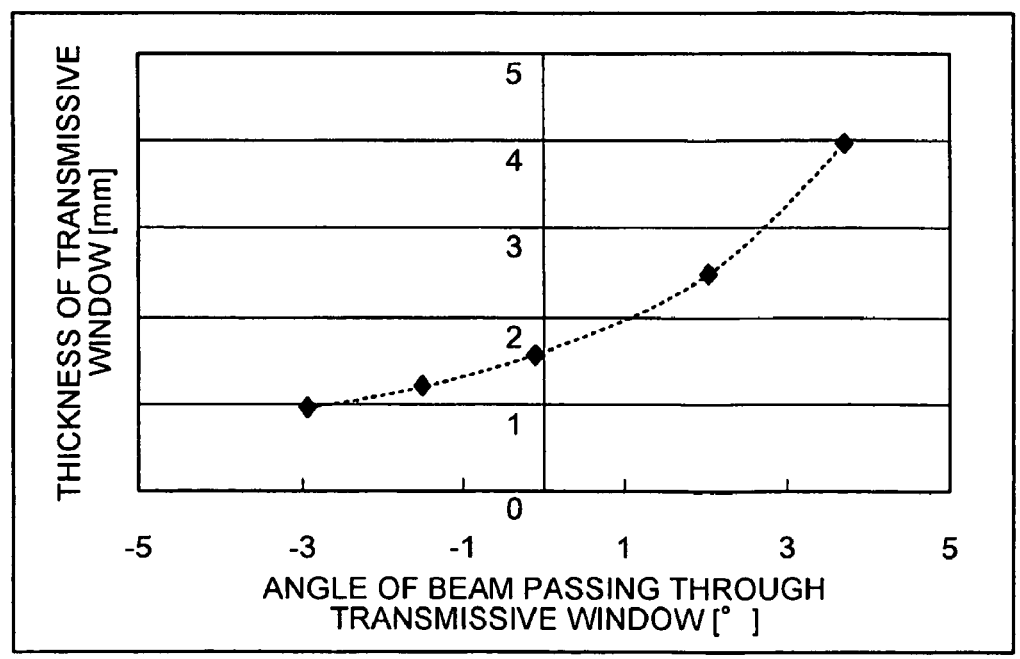
FIG. 7 is a graph showing a relationship between beam angle and thickness of the transmissive window (θ=5°)

FIG. 7 is a graph showing a relationship between an angle of a beam that passes through the transmissive window and the thickness of the transmissive window (θ=5°). In FIG. 7, the horizontal axis indicates an angle of a beam that passes through the transmissive window 12. The vertical axis indicates the thickness (mm) of the transmissive window 12. FIG. 7 illustrates a calculation example when the transmissive window 12 is sapphire crystal, an angular difference θ between the crystal axis (C-axis) of the sapphire crystal and a beam is 5°, and the thickness t(x) of the transmissive window 12 is at least approximately 1 mm.

When the angular difference θ is 5°, as shown in FIG. 7, the thickness t(x) of the transmissive window 12 has characteristics close to a quadratic function with respect to an angle of a beam passing through the transmissive window 12. On the other hand, as shown in FIG. 6, when the angular difference θ is approximately 20° to 70°, especially, when approximately 30° to 60°, the birefringence has characteristics close to a linear function.

Figure 8:
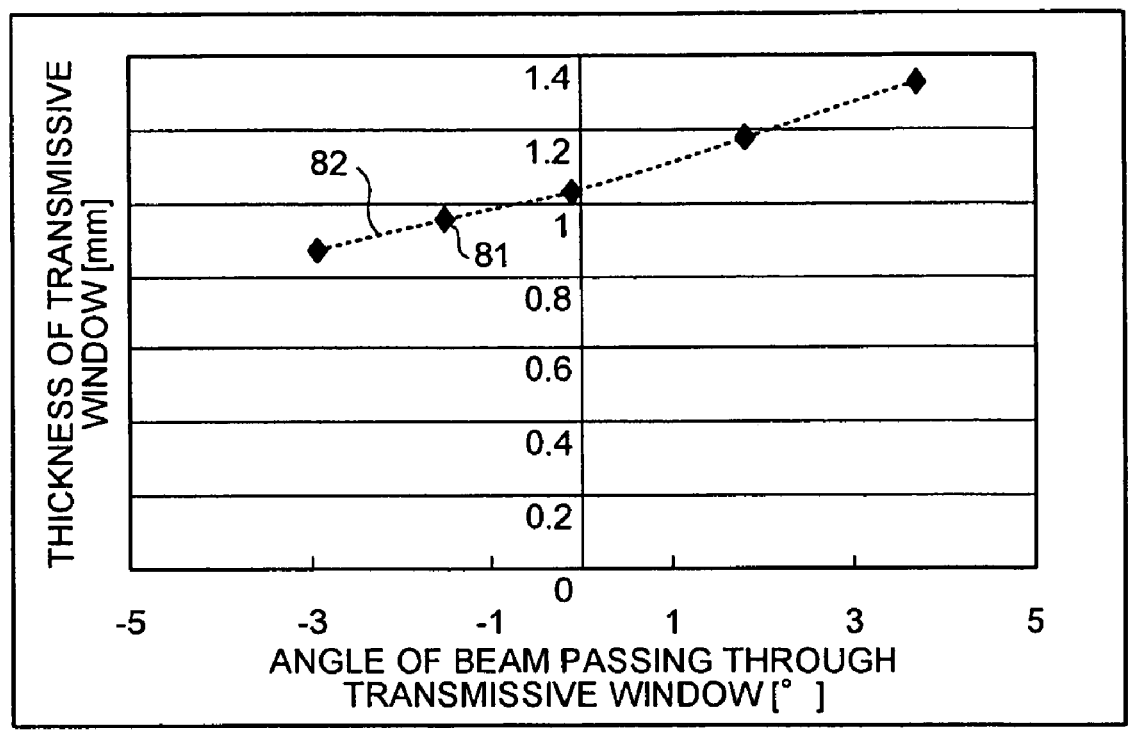
FIG. 8 is a graph showing a relationship between beam angle and the thickness of the transmissive window (θ=30°)

FIG. 8 is a graph showing a relationship between an angle of a beam that passes through the transmissive window and the thickness of the transmissive window (θ=30°). In the graph shown in FIG. 8, a dot 81 indicates a calculation value. A broken line 82 shows characteristics in which the dot 81 is approximated by a linear function. FIG. 8 illustrates a calculation example when the angular difference θ between the crystal axis (C-axis) of the sapphire crystal and a beam is 30° while other conditions are the same as those in the example shown in FIG. 7, and the thickness t(x) of the transmissive window 12 is maintained at approximately 1 mm.

In this case, the thickness t(x) of the transmissive window 12 has characteristics close to a linear function with respect to an angle of a beam that passes through the transmissive window 12, as indicated by the broken line 82 shown in FIG. 8. Therefore, a transmissive surface of the transmissive window 12 can be formed in a flat plane. For example, the transmissive window 12 can be formed in a wedge shape having no curvature and a thickness that changes linearly. As a result, the transmissive window 12 becomes easy to manufacture.

Figure 9:
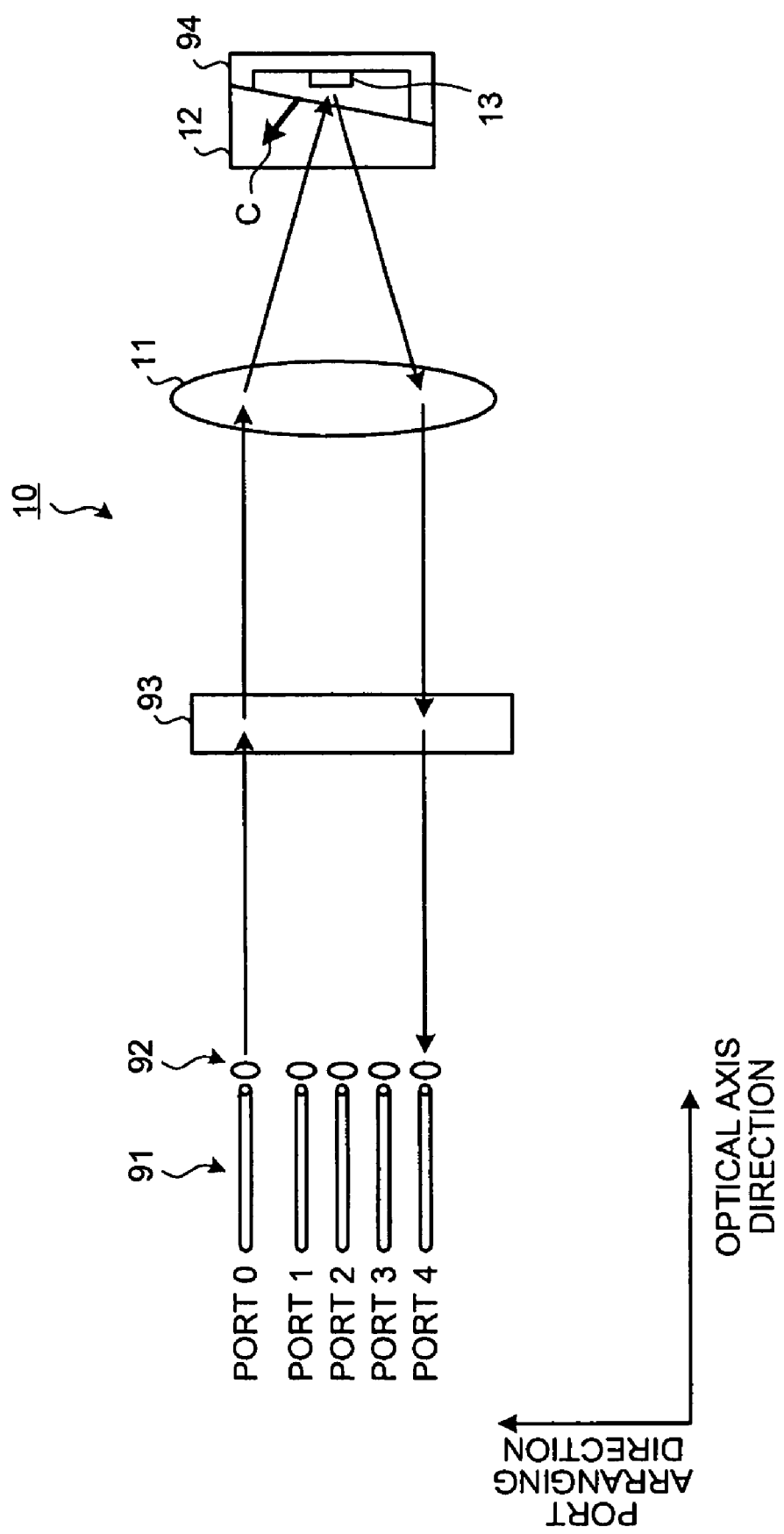
FIG. 9 is a front view of the optical switch in which the transmissive window is formed in a wedge shape.

FIG. 9 is a front view of an optical switch in which the transmissive window is formed in a wedge shape. In the example shown in FIG. 9, a numeral 91 indicates an optical fiber group that forms port 0 to port 4. A numeral 92 indicates a collimating lens group that is arranged corresponding to port 0 to port 4. A numeral 93 indicates a dispersing element such as a diffraction grating. A numeral 94 indicates a casing that airtightly seals the MEMS mirror 13.

As shown in FIG. 9, the transmissive window 12 formed in a wedge shape is arranged in the casing 94 at a position through which a beam that is transmitted between the converging lens 11 and the MEMS mirror 13 passes. The dispersing element 93 is arranged at such an angle that the dispersing element 93 disperses a passing beam toward a direction different from the port arranging direction (for example, a direction perpendicular to the port arranging direction and the direction of the optical axis). The MEMS mirror 13 is arrayed in plural in a spectral direction of the dispersing element 93.

Figure 10:
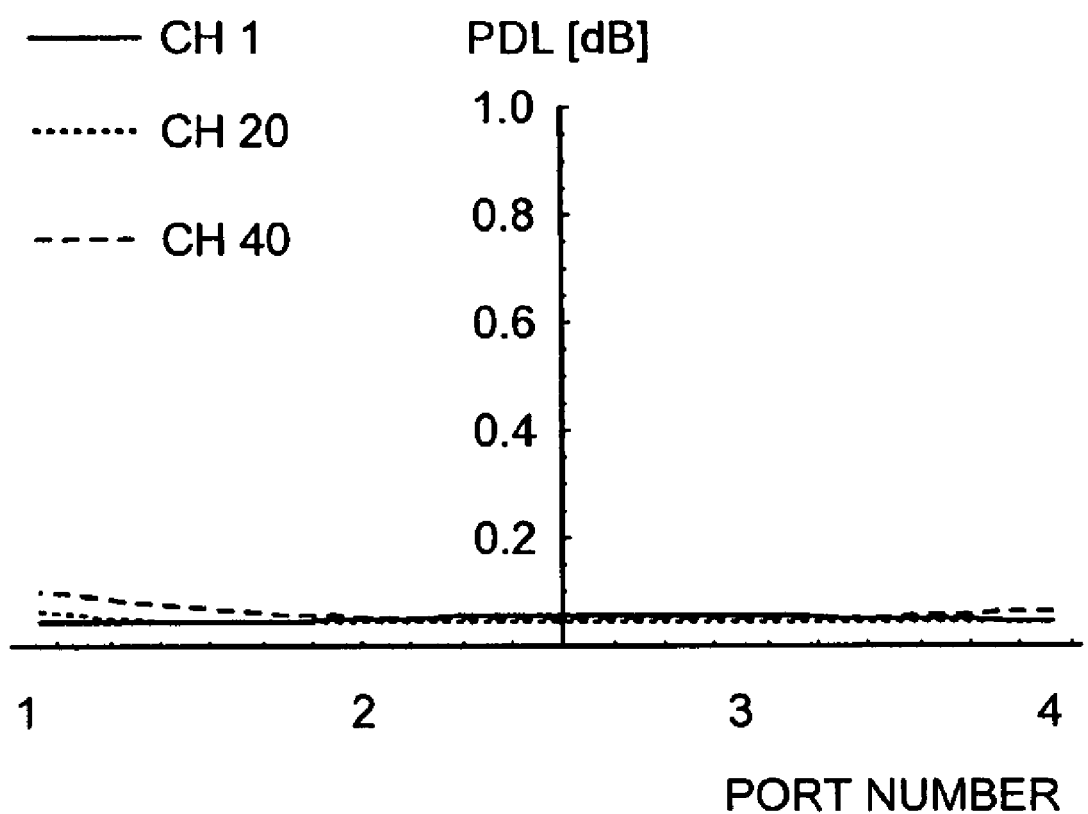
FIG. 10 is a graph showing PDL characteristics when the transmissive window is formed in a wedge form.

FIG. 10 is a graph showing PDL characteristics of the optical switch when the transmissive window is formed in a wedge form. By forming the transmissive window 12 of the casing 94 in a wedge form as shown in FIG. 9, it is possible to substantially completely cancel initial PDL at port 1 to port 4 while the transmissive window 12 has the thickness t of approximately 1 mm as shown in FIG. 10.

As described, in addition to the effects of the optical switch 10 according to the first embodiment, with the optical switch 10 according to the second embodiment, the function of the λ/4 plate can be imparted to the transmissive window 12 in the casing 94 of the MEMS mirror 13 irrespective of input and output ports to be used by distributing the thickness t of the transmissive window 12. Therefore, it is possible to reduce PDL sufficiently while maintaining the thickness t of the transmissive window 12.

In the example shown in FIG. 10, PDL at port 1 and port 4 is a little higher than PDL at port 2 and port 3. Based on such characteristics, the transmissive window 12 can be formed such that the transmissive surface thereof has a curvature. Thus, PDL at port 1 and port 4 can be further reduced, and the port dependency of PDL can be eliminated.

Figure 11:
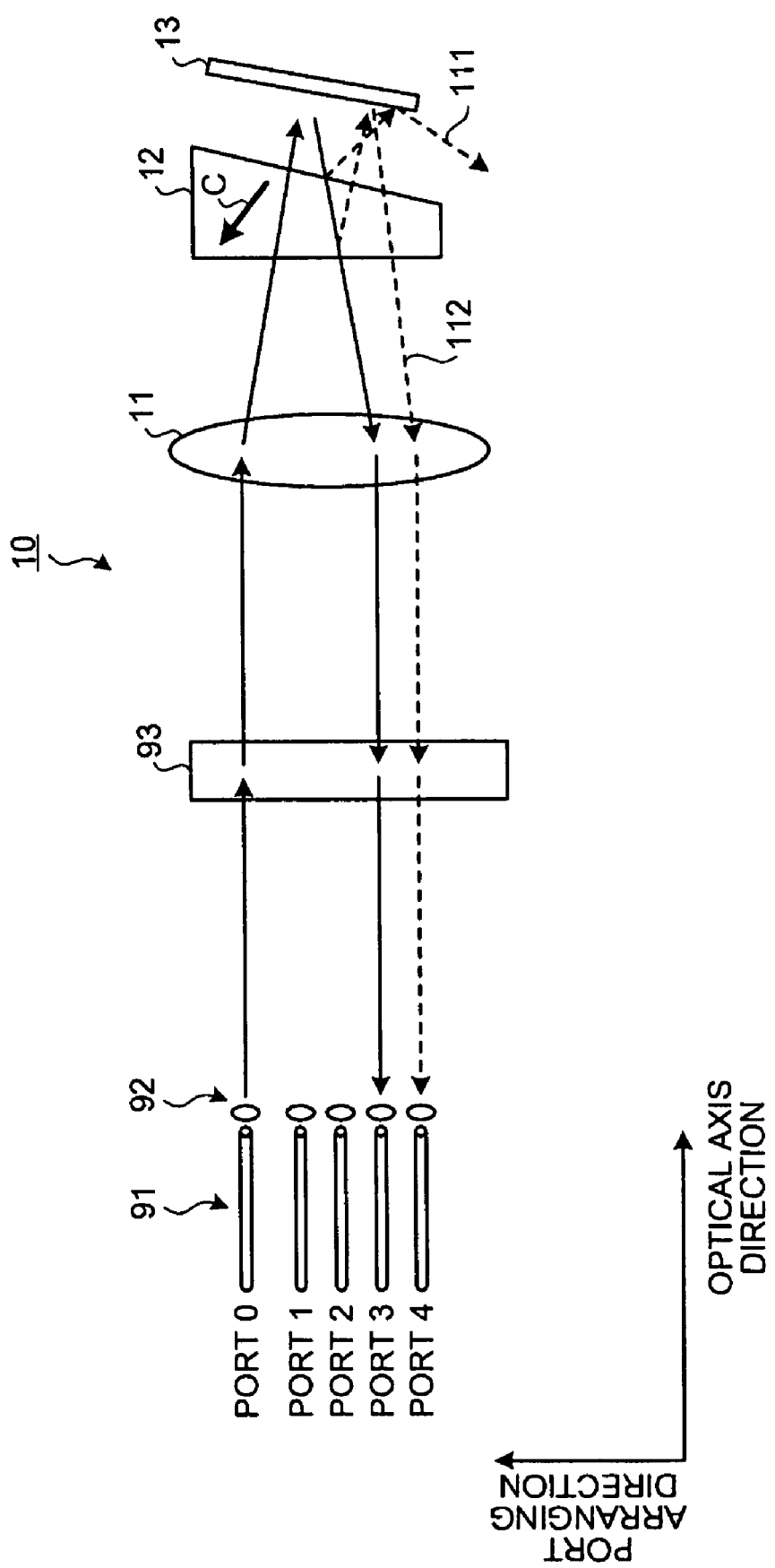
FIG. 11 shows crosstalk caused by reflection from the MEMS mirror.

FIG. 11 shows crosstalk caused by reflection from the MEMS mirror. A broken line 111 indicates a component that is reflected again from the surface of the transmissive window 12 opposing the MEMS mirror 13. The component indicated by the broken line 111 is among components of light transmitted from the converging lens 11 through the transmissive window 12 to the MEMS mirror 13 and reflected by the MEMS mirror 13. A broken line 112 indicates a component that is reflected again from the surface of the transmissive window 12 opposing the converging lens 11. The component indicated by the broken line 112 is among the components of light transmitted from the converging lens 11 through the transmissive window 12 to the MEMS mirror 13 and reflected by the MEMS mirror 13.

As shown in FIG. 11, when a tilt of the transmissive window 12 with respect to the port arranging direction is small, crosstalk in which a beam enters an unintended port can occur. In this example, a part of a beam that is transmitted to port 3 enters port 4 as indicated by the broken line 112. To tackle this problem, a configuration that prevents the occurrence of crosstalk by maintaining a large tilt of the transmissive window 12 with respect to the port arranging direction is explained as a third embodiment of the present invention.

Figure 12:
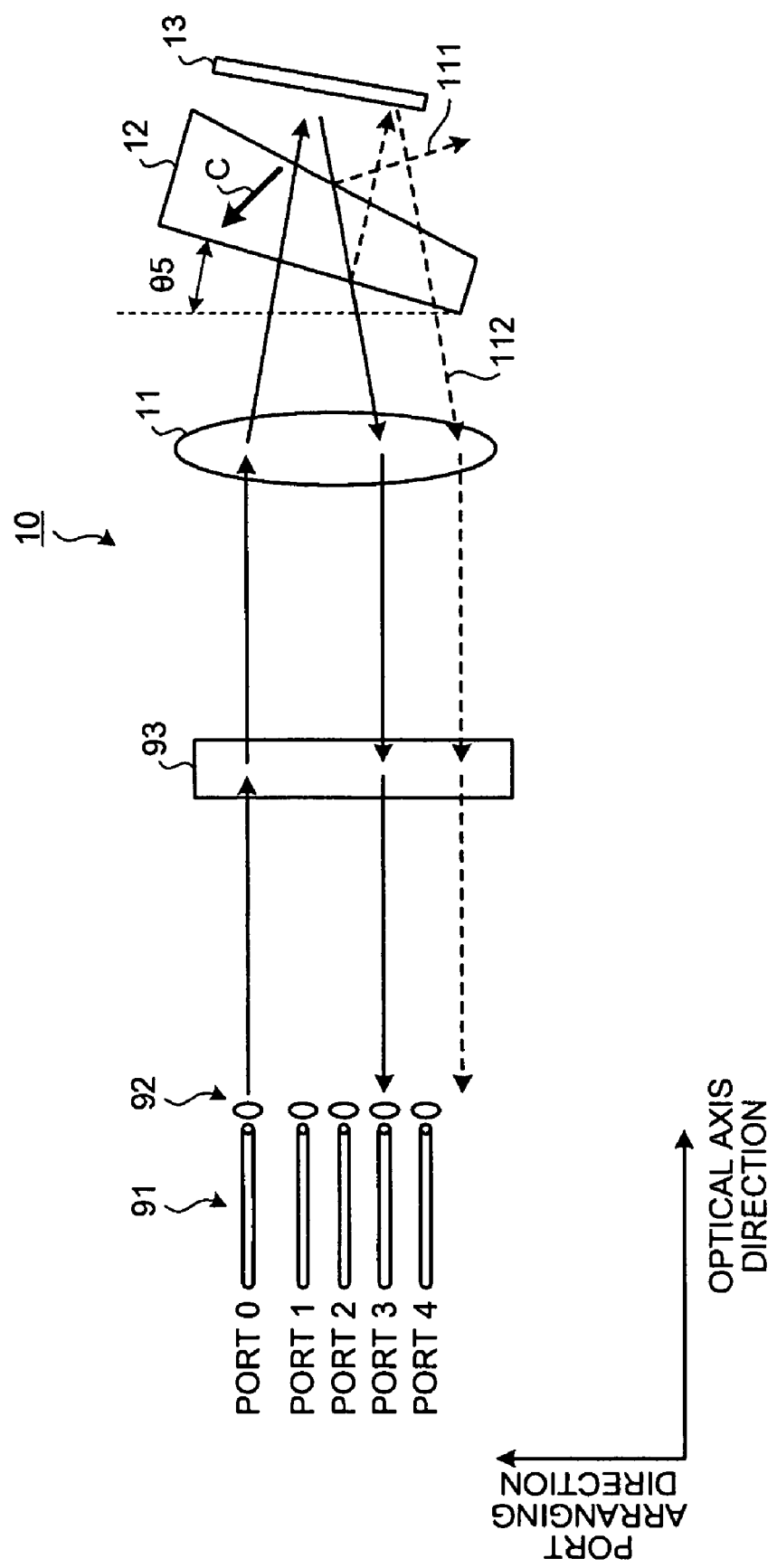
FIG. 12 is a front view of an optical switch according to the third embodiment.

FIG. 12 is a front view of an optical switch according to the third embodiment. In FIG. 12, like reference characters are used to identify like parts shown in FIG. 11. As shown in FIG. 12, in the optical switch 10 according to the third embodiment, the transmissive window 12 is tilted by an angle θ5 with respect to the port arranging direction.

Specifically, the transmissive window 12 is tilted such that the component indicated by the broken line 111 or the broken line 112 does not enter any port 0 to port 4. In this example, it becomes possible to prevent the component indicated by the broken line 112, which enters port 4 in the example shown in FIG. 11, from entering any port 1 to port 4 by the tilt of the transmissive window 12.

As described, in addition to the effects of the optical switch 10 according to the first embodiment and the second embodiment, with the optical switch 10 according to the third embodiment, the occurrence of crosstalk can be prevented by tilting the transmissive window 12 by the angle θ5 with respect to the port arranging direction. Therefore, noise caused by the crosstalk can be suppressed.

Figure 13:
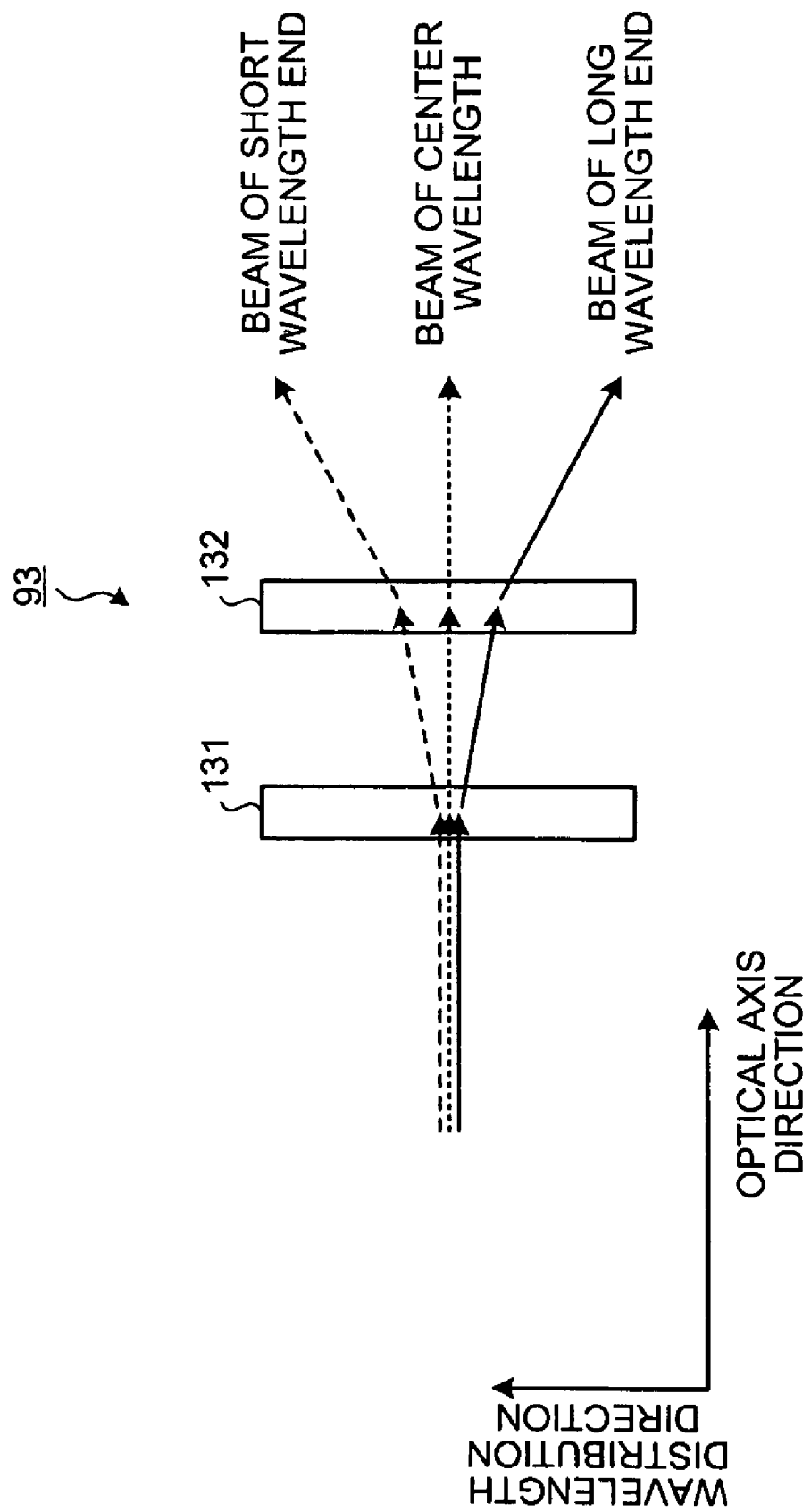
FIG. 13 is a front view of an optical switch according to a fourth embodiment.
Figure 14:
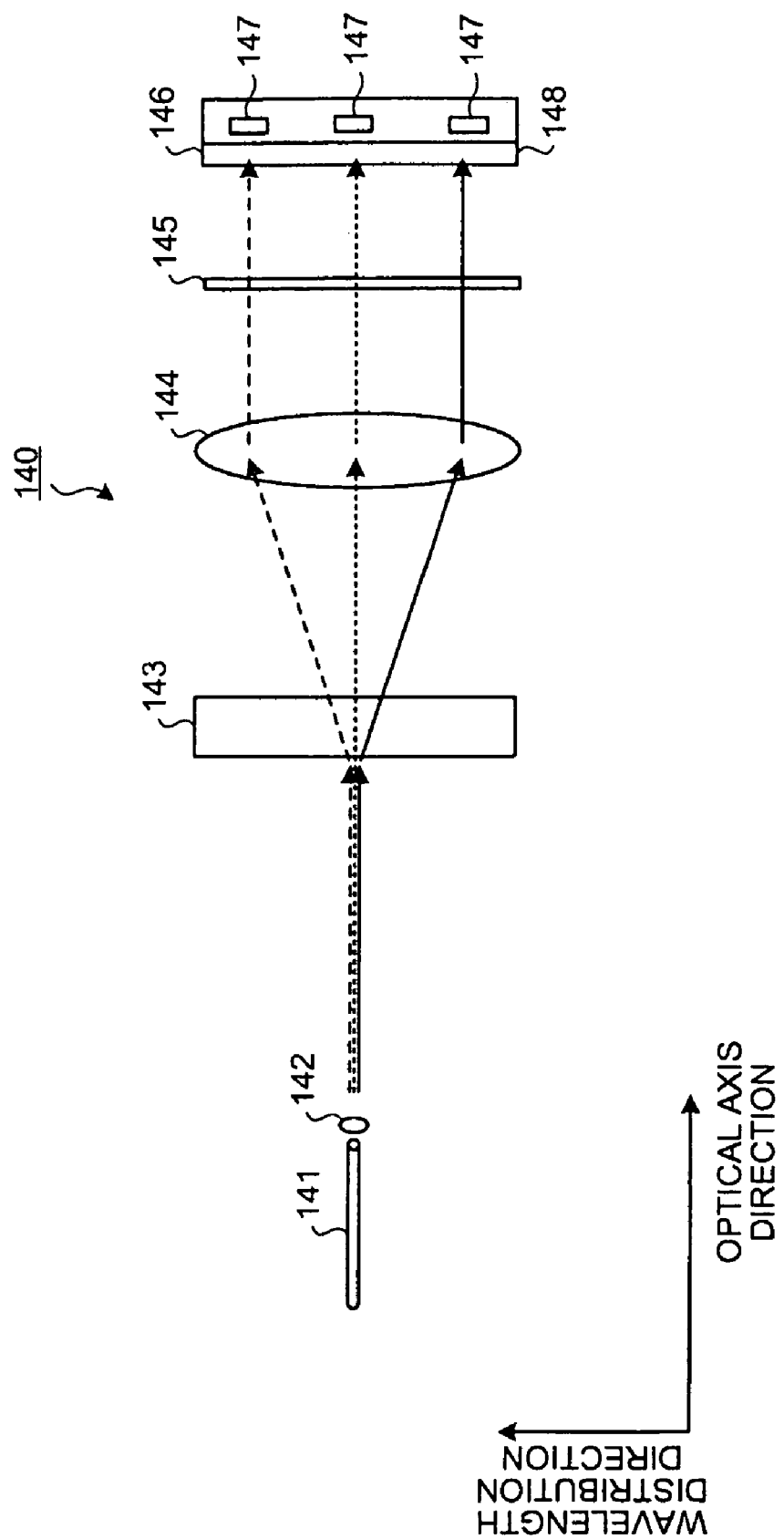
FIG. 14 is a plan view of a conventional wavelength selective switch.

FIG. 13 is a front view of an optical switch according to a fourth embodiment of the present invention. As shown in FIG. 13, the dispersing element 93 of the optical switch 10 according to the fourth embodiment includes diffraction gratings 131 and 132 through which a beam passes. This arrangement doubles the extent of wavelength dispersion, and the space between the MEMS mirrors 13 can be doubled without changing the converging lens 11.

By increasing the space between the MEMS mirrors 13, a MEMS package in which the MEMS mirrors 13 are arranged in an array becomes easy to manufacture. In this case, PDL caused by the dispersing element 93 is also doubled. However, through the function of the λ/4 plate of the transmissive window 12 of the present invention, PDL can be sufficiently reduced.

As described, in addition to the effects of the optical switch 10 according to the first to the third embodiments, with the optical switch 10 according to the fourth embodiment, a MEMS package becomes easy to manufacture because the space between the MEMS mirrors 13 can be increased by forming the dispersing element 93 with the plural diffraction gratings 131 and 132.

The present invention is applicable not only to an optical switch using a MEMS package but also to general MEMS packages in which a movable reflector is airtightly enclosed in a casing, and incorporation of the function of a λ/4 plate is additionally effected. Moreover, the MEMS package is not limited to one in which a movable reflector is airtightly enclosed in a casing, and the present invention is also applicable to MEMS packages in which a movable reflector is enclosed in a casing such that the reflector is protected.

Furthermore, the optical switch according to the embodiments of the present invention is not limited to a wavelength selective switch, and the present invention is applicable to all optical switches that use a MEMS package. For example, the optical switch can be an optical switch that switches routes of a single beam.

As described above, according to the optical switch and the MEMS package according to the embodiments of the present invention, by imparting the function of a λ/4 plate to a transmissive window of a MEMS package, PDL can be reduced by a simple configuration without a λ/4 plate. As a result, the size of the optical switch can be reduced, the manufacturing process of the optical switch is simplified, and the cost of the optical switch and the MEMS package can be reduced. Moreover, durability of the optical switch and the MEMS package is improved and the handling thereof becomes easy.

As described above, according to the embodiments of the present invention, PDL can be reduced by a simple configuration without a λ/4 plate.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An optical switch comprising:
    a plurality of ports through which a beam is input and output;
    an optical system through which the beam passes;

a movable reflector that is enclosed in a casing and reflects, at a variable angle, the beam that has passed through the optical system; and a transmissive window that is disposed in the casing at a position through which the beam passes, is made of a uniaxial crystal, and obtains a phase difference with respect to the beam passing therethrough having a wavelength λ, the phase difference being ·λ/4 times a positive odd integer and resulting from a setting of an orientation of a crystal axis and a thickness of the transmissive window, wherein the thickness of the transmissive window is distributed in a direction in which the ports are arranged such that the phase difference is obtained irrespective of the port through which the beam passes.

2. The optical switch according to claim 1, wherein $$t(x)=(2m+1)\times\lambda/(4\times F(x))$$

is satisfied, where
x is a position x of the ports respectively;
t(x) is the thickness of the transmissive window at a position through which the beam transmitted from the port at the position x passes;
F(x) is a function determined from the orientation of the crystal axis, birefringence of the transmissive window, and an angle of the beam passing therethrough; and
λ is the wavelength λ.

3. The optical switch according to claim 2, wherein t(x) is approximated by a linear function.

4. The optical switch according to claim 1, wherein the transmissive window is tilted at a given angle with respect to a direction in which the ports are arranged.

5. The optical switch according to claim 1, wherein
the optical system includes
a dispersing element that separates the beam passing therethrough into components according to wavelength, and
a converging lens that respectively converges the components, and
the movable reflector is disposed in plurality in an array corresponding to each of the components respectively converged by the converging unit.

6. The optical switch according to claim 5, wherein the dispersing element includes a plurality of diffraction gratings through which the beam passes.

7. The optical switch according to claim 1, wherein the uniaxial crystal is a sapphire crystal.

8. A MEMS package comprising:
a movable reflector that reflects a beam at a variable angle;
a casing that encloses the movable reflector; and a transmissive window that is disposed in the casing at a position through which the beam passes, is made of a uniaxial crystal, and obtains a phase difference with respect to the beam passing therethrough having a wavelength λ, the phase difference being ·λ/4 times a positive odd integer and resulting from a setting of an orientation of a crystal axis and a thickness of the transmissive window, wherein the thickness of the transmissive window is distributed in a direction in which the ports are arranged such that the phase difference is obtained irrespective of the port through which the beam passes.

9. An optical switch comprising:
a plurality of ports through which a beam is input and output;
an optical system through which the beam passes;
a movable reflector that is enclosed in a casing and reflects, at a variable angle, the beam that has passed through the optical system; and
a transmissive window that is disposed in the casing at a position through which the beam passes, is made of a uniaxial crystal, and obtains a phase difference with respect to the beam passing therethrough having a wavelength λ, the phase difference being ·λ/4 times a positive odd integer and resulting from a setting of an orientation of a crystal axis and a thickness of the transmissive window, wherein
a surface of the transmissive window is tilted at a given angle with respect to a direction in which the ports are arranged.

* * * * *